United States Patent [19]

Doi

[11] Patent Number: 4,971,299

[45] Date of Patent: Nov. 20, 1990

[54] ENGINE MOUNTING DEVICE UTILIZING ELECTRORHEOPECTIC FLUID

[75] Inventor: Kazuhiro Doi, Yokohama, Japan

[73] Assignee: Nissan Motor Co., Ltd., Yokohama, Japan

[21] Appl. No.: 381,068

[22] Filed: Jul. 18, 1989

[30] Foreign Application Priority Data

Jul. 29, 1988 [JP] Japan .................................. 63-190888

[51] Int. Cl.$^5$ .............................................. F16F 9/346
[52] U.S. Cl. .................................. 267/140.1; 267/218
[58] Field of Search ..................... 188/267; 248/566; 267/217, 218, 140.1 C, 140.1 AE, 140.1 E

[56] References Cited

U.S. PATENT DOCUMENTS 4,458,888  7/1984  Wolf et al. ...................... 267/140.1

FOREIGN PATENT DOCUMENTS 60-104828  6/1985  Japan .
0206838    9/1986  Japan ............................ 267/140.1 C Primary Examiner—Duane A. Reger Attorney, Agent, or Firm—Foley & Lardner, Schwartz, Jeffery, Schwaab, Mack, Blumenthal & Evans

[57] ABSTRACT

An ERF filled engine mount features an annular member which is disposed within inner and outer coaxial tubular members. This member is formed with two short channels and one long one along its outer periphery. The short channels are formed so as to be essentially diametrically opposed sides of the annular member and to extend about ¼ of the external perimeter thereof. The longer channel is axially offset from the two shorter ones and arranged to extend about ¾ of the perimeter. The outer tubular member closes the channels and defines a pair of primary orifice passages and a single secondary one. An elastomeric member which operatively interconnects the inner and outer tubular members is formed to define a main chamber and an auxiliary one. Apertures formed in the ends of the passages permit the main and auxiliary chambers to communicate via the orifice passages. Electrode plates which are disposed in the channels are staggered around the periphery of the annular member in a manner wherein the impresssion of a voltage on one does not cause the ERF in another orifice passage to undergo an increase in voltage.

8 Claims, 3 Drawing Sheets

ENGINE MOUNTING DEVICE UTILIZING ELECTRORHEOPECTIC FLUID

BACKGROUND OF THE INVENTION

1. Field of the Invention

The present invention relates generally to mounting devices of the nature used to support vibrating bodies, and more specifically to a mounting device which utilizes an electrorheopectic fluid (ERF).

2. Description of the Prior Art

JP-A-60-104828 describes an example of damping type unit which takes the form of a hollow elastomeric bush member filled with an electrorheological or electrorheopectic fluid (viz., an ERF as it will simply be referred to hereinafter) and which is further provided with an electrically controlled orifice unit which divides the device into a working chamber and an expansion chamber. With this device, when the bush is compressed, fluid is displaced from the working chamber into the auxiliary one (defined between the orifice unit and a relative flexible diaphragm) and vice versa. By applying a high voltage across the electrodes of the orifice, the viscosity of the ERF can be induced to undergo a remarkable increase and the fluid in the orifice passage induced to assume to an almost solid state. Under these conditions the orifice is either effectively blocked or the restrictive properties thereof remarkably increased.

However, this arrangement has suffered from the drawback that it tends be bulky and therefore difficult to use an engine mount.

SUMMARY OF THE INVENTION

It is an object of the present invention to provide a vibration damping device which is sufficiently compact as to be suitable for use as engine mount.

In brief, the above object is achieved by an ERF filled engine mount wherein an annular member which is disposed within inner and outer coaxial tubular members. This member is formed with two short channels and one long one along its outer periphery. The short channels are formed so as to be essentially diametrically opposed sides of the annular member and to extend about 174 of the external perimeter thereof. The longer channel is axially offset from the two shorter ones and arranged to extend about ¾ of the perimeter. The outer tubular member closes the channels and defines a pair of primary orifice passages and a single secondary one.

An elastomeric member which operatively interconnects the inner and outer tubular members is formed to define a main chamber and an auxiliary one. Apertures formed in the ends of the passages permit the main and auxiliary chambers to communicate via the orifice passages. Electrode plates which are disposed in the channels are staggered around the periphery of the annular member in a manner wherein the impression of a voltage on one does not cause the ERF in another orifice passage to undergo an increase in voltage.

More specifically, a first aspect of the present invention is deemed to comprise a vibration damping device which features: an inner tubular member; an outer tubular member, the outer tubular member being disposed coaxially about the inner tubular member; an elastomeric body, the elastomeric body disposed between the inner and outer tubular members, the elastomeric body being formed with recess which define a main working chamber, an air chamber, an auxiliary chamber and a diaphragm, the diaphragm being arranged to separate the air chamber from the auxiliary chamber; an annular member disposed about the periphery of the elastomeric member and arranged to juxtapose the inner periphery of the outer tubular member; first, second and third discrete channels, the first, second and third channels being formed in the external periphery of the annular member, the first and second channels having first and second lengths which are essentially equal and the third channel having a third length which is longer the first and second lengths, the first, second and third grooves being enclosed by the outer tubular member in a manner to define first, second and third orifice passages, the first, second and third orifice channels communicating with the main working chamber at their respective first ends and with the auxiliary chamber at their respective second ends; and first second and third electrodes disposed in the first second and third channels respectively.

A second aspect of the present invention is deemed to comprise a mounting device which features: first and second rigid structural members, the second member being hollow, arranged about the first member and electrically grounded; an elastomeric body, the elastomeric body being interposed between the first and second members; an annular member disposed about the periphery of the elastomeric member and arranged to juxtapose the inner periphery of the second structural member, the annular member being formed with first, second and third discrete channels in the external periphery thereof, the first and second channels having first and second lengths and the third channel having a third length which is twice as long the first length, the first, second and third grooves being enclosed by the second structural member in a manner to define first, second and third orifice passages; first second and third electrically conductive electrode members respectively disposed in the first second and third channels; means defining a first recess in the elastomeric body, the first recess being arranged to cooperate with the inner periphery of the annular member in a manner to define a first chamber, the first aperture being arranged to open into the first chamber; means defining a second recess in the elastomeric body, the second recess being arranged to cooperate with the inner periphery of the annular member in a manner to define a second chamber, the second and third apertures being arranged to open into the second chamber, the elastomeric body being further formed with a diaphragm which is exposed to the second chamber, the first and second chambers and the first, second and third orifice passages being filled with an electrorheological fluid; and connection means which provides an electrical connection between the first and second electrode members and a separate electrical connection with the third electrode member.

DETAILED DESCRIPTION OF THE PREFERRED EMBODIMENTS

Figure 1:
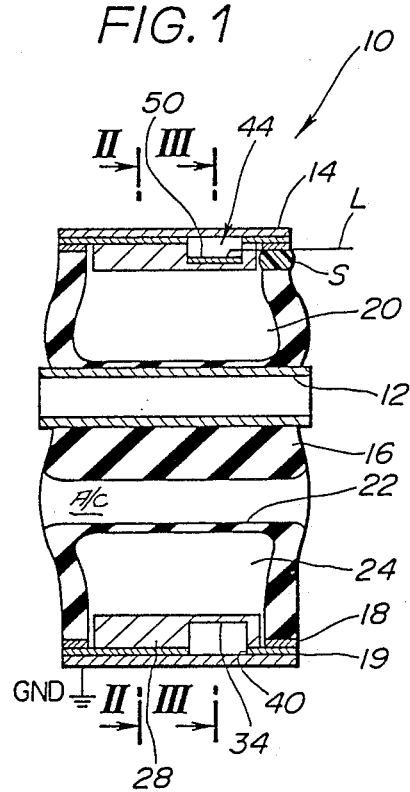
FIG. 1 is a side sectional elevation showing the constructional arrangement of an embodiment of the present invention.

FIGS. 1 to 4 shows the constructional features of an engine mount according to the present invention.

Inner and outer coaxially arranged tubular members 12, 14 are resiliently interconnected by way of an elastomeric body 16. In this instance the elastomeric body is permanently connected to the inner tubular member 12 via vulcanization or the like.

Merely by way of example, the inner tubular member is arranged to be connected to the engine or power unit (engine and transmission) while the outer tubular member is arranged to be connected with the vehicle chassis or a similar structure which is associated with the power unit.

An annular re-enforcement member 18 and a elastomeric layer 19 are disposed between the outer tubular member 14 and the elastomeric body in the illustrated manner to establish a hermetic seal therebetween.

The elastomeric body is formed with cavities which define a main working chamber 20, and air chamber A/C, a diaphragm 22 and an auxiliary chamber 24. As shown in FIG. 1, the main working chamber 20 and the auxiliary working chamber 24 are located on opposite sides of inner tubular member 12. Note that the diaphragm 22 is formed in a manner to separate the air and the auxiliary chambers A/C, 24 and that in this embodiment both ends of the air chamber A/C are open to the ambient atmosphere (see FIG. 1).

Figures 4, 5:
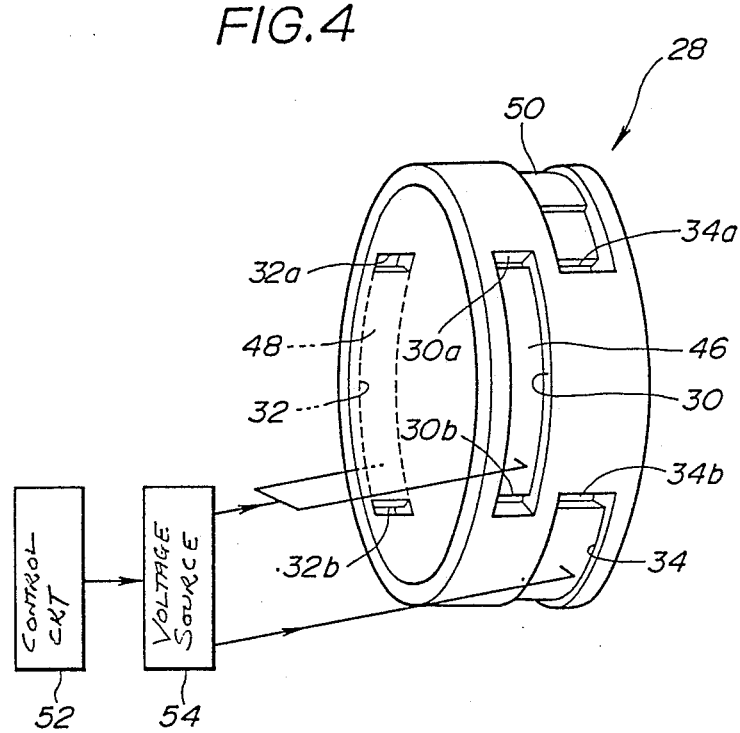
FIG. 4 is a perspective view of a a member which forms a vital part of the embodiment of the present invention.
FIG. 5 is a chart which shows in terms of frequency and a displacement transmission ratio, the effect of the present invention.

A rigid, annular non-conductive member 28 (made of a suitable synthetic resin, plastic or the like) is disposed within the outer tubular member 14 and about the center portion of the elastomeric body 16. As best seen in FIG. 4, this member 28 is formed with a plurality of elongate recesses which define channels 30, 32 and 34; and apertures 30a, 30b, 32a, 32b, 34a and 34b at the ends of the respective channels.

Figure 2:
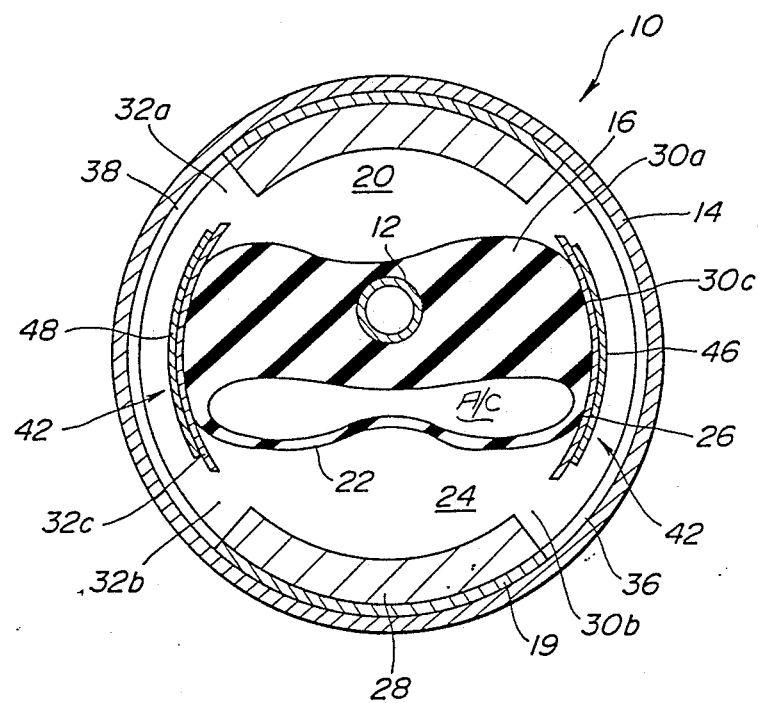
FIGS. 2 and 3 are front sectional elevations taken along section lines II—II and III—III respectively.
Figure 3:
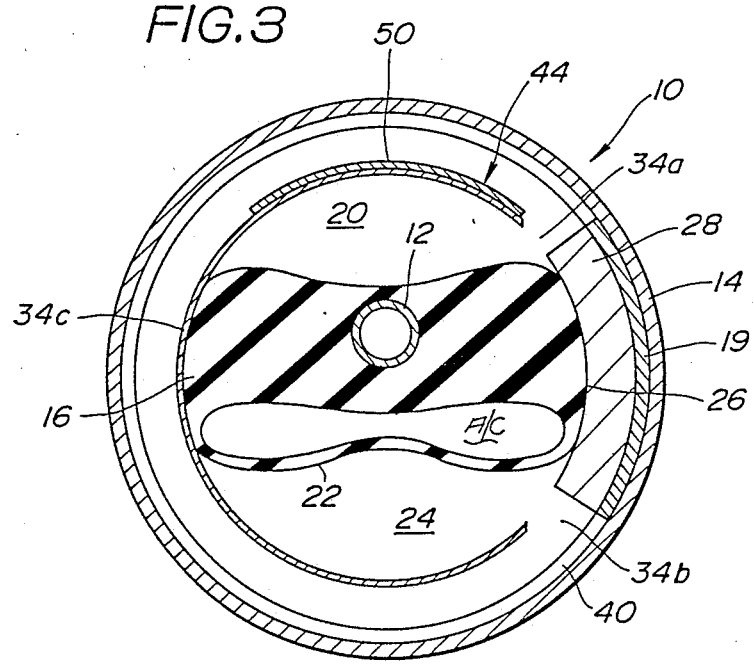

As will be appreciated from FIGS. 2 and 3, apertures 30a, 32a, and 34a are such as to provide communication between the main working chamber 20 and the respective channels, while the apertures 30b, 32b and 34b establish fluid communication between the respective channels and the auxiliary chamber 24.

The channels 30, 32 are arranged to have lengths which are essentially equal to ¼ of the outer periphery of the annular member 28 and are located in essentially diametrically opposed positions. The channel 34 is arranged to have a length which is about ¾ of the outer periphery and is located so that the apertures 34a and 34b which are formed at the ends thereof are located essentially adjacent apertures 30a and 30b as shown.

The channels 30, 32 and 34 are closed by the outer tubular member 14 in a manner to define two primary and one secondary orifice passages 42, 42 and 44. The elastomeric layer 19 is formed with cut outs 36, 38, 40 which correspond to the locations of the channels 30, 32 and 34. With this arrangement the sealing elastomeric layer 19 is not exposed to the flow of fluid through the passages and therefore not subject to erosion and therefore the cross-sectional area of the passages are not subject to change with the passing of time.

Electrode plates 46, 48 and 50 are disposed on the bottoms 30c, 32c and 34c of the two primary and one secondary orifice passages and in the locations indicated in FIGS. 2 and 3 wherein they are as distal as practical from one another.

Lead lines L are arranged to selectively interconnect the electrode plates with a control circuit 52 and a source of voltage 54. These lead lines are arranged to pass between the elastomeric layer 19 and a seal member S (see FIG. 1). As will be appreciated from FIG. 4, the electrodes 46, 48 in the primary orifice passages 46, 46 are arranged to have a voltage impressed simultaneously thereon.

The outer annular member 14 is formed of metal and connected to ground so as to act as the complementary electrode for each of the electrodes defined by the electrode plates 46, 48 and 50.

With the above described arrangement, the ERF with with the device is filled, can be pumped back and forth between the main working chamber 20 and the auxiliary chamber 24 by way of the primary and secondary orifice passages 42, 42 and 44. As each of the primary and secondary orifice passages exhibit two different resonance characteristics, the vibration damping provided by the arrangement is improved during this pumping action.

Further, as the orifice passages 42, 42 and 44 are formed so as to extend about the inner periphery of the outer tubular member 14, the length of the same is notably longer than in the case of those used in the above mentioned prior art. Therefore it is possible to adjust the dimensions of the orifice passages (i.e. changing the lengths and cross-sectional areas) in a manner which enables the resonance frequencies to be set in relatively low frequency zones and thus improve the vibration damping characteristics during engine idling and the like.

That is to say, during engine idling when the vibration frequency coincides with the resonance frequency of the primary orifice passages 42, 42, it is possible to impress a voltage on the electrode plate 50 which is disposed in the secondary orifice passage and thus induce the ERF in proximity thereof to undergo an increase in viscosity. This effectively closes the secondary orifice passage 44.

Under these conditions, while the ERF in the primary orifice passages 42 is resonating, the dynamic spring constant of the mount assumes a low value as indicated by circle A in FIG. 5. By "tuning" the primary orifice passage structure (viz, selecting the cross-sectional area and length) so that this coincides with the peak idle frequency, it is possible to achieve a good reduction in the amount of vibrational energy which is transmitted through the mount and therefore reduce the amount of power unit vibration which reaches the vehicle chassis.

It should be noted that due to the provision of the two primary passages 42, 42 the effective cross sectional area of the passage arrangement through which the ERF is displaced is quite large and therefore during the low frequency range in which idle occurs, the reduction in the dynamic spring constant of the device is increased.

During modes of operation when engine shake is produced, the resonance which occurs in the long secondary orifice passage is employed to attenuate vibration. At this time a voltage is impressed on the electrode plates 46 and 48. This increases the viscosity of the ERF therein and effectively closes the same.

The resonance of the slug of fluid which is contained in the secondary orifice passage 44 produces an amplification in the loss factor as indicated by the circle B in FIG. 5. By "tuning" the secondary orifice passage, it is possible to bring about the situation wherein the loss factor peak coincides with the occurrence of engine shake, it is possible to achieve a substantial increase in movement attenuation.

It should be noted that it is possible to control the impression of a voltage on the electrode 50 in an ON/OFF manner which effectively increases the attenuation of engine shake. In other words, during engine shake, a voltage is constantly impressed on the electrode plates 46 and 48 and selectively applied in an ON/OFF manner to the electrode plate 50.

It will be also noted that as the electrode plates 46 and 48 are arranged to be offset in the lateral direction and staggered about the periphery of the annular member 28, the impression of a voltage on the electrode plates in the primary orifice passages 42, 42 does not induce a change in the viscosity in the secondary passage 44 and vice versa. Moreover, the chances of an arc occurring between the electrode plates is also obviated by the staggered/offset spacing arrangement.

With the above arrangement it is possible to render the engine mount highly compact while assuring good vibration and power unit movement attenuation during engine idling and modes when engine shake tends to be produced.

For information relating to the control of voltages which are applied to the first second and third electrodes, reference can be had to copending U.S. application Ser. No. 07/330,689 filed on Mar. 20, 1989 in the name of Kazuhiko DOI and claiming priority based on Japanese Patent Application No. P63-79291. The content of this document is hereby incorporated by reference thereto.

This application describes a device suited for use as an automotive power unit mount and which features an elastomeric body formed with first and second recesses which respectively define a working chamber and an expansion chamber. The recesses are enclosed by an annular member to define the chambers and filled with an ERF. Serially arranged first and second helical orifice passages which are formed about the periphery of the annular member fluidly interconnect the chambers. A cylindrical outer casing which encloses the elastomeric body and annular member is grounded to act as a first electrode. Strips disposed in the orifice passages act as electrodes on which voltages can be selectively and separately impressed.

In order to determined the application of a voltage to the electrode strips, a parameter such as vehicle speed V is sampled and compared with a predetermined threshold value (V=0). When the vehicle speed is equal to this value, electrode in the longer passage has a voltage impressed thereon.

When the vehicle speed V is not equal to zero, it is deemed that engine shake is apt to occur and a voltage is impressed on the electrode in the short passage. In addition to this, depending on the speed at which the relative displacement of the engine is occurring, the electrode in the longer orifice passage is selectively connected in an ON/OFF manner with the source of voltage. Viz., depending on the magnitude of the acceleration of the power in the vertical direction, the flow resistance of the longer orifice passage is selectively raised and lowered.

What is claimed is:

1. A vibration damping device comprising:
an inner tubular member;
an outer tubular member, said outer tubular member being disposed coaxially about said inner tubular member;
an elastomeric body, said elastomeric body disposed between said inner and outer tubular members, said elastomeric body being formed with recesses which define a main working chamber, an air chamber, an auxiliary chamber and a diaphragm, said diaphragm being arranged to separate the air chamber from the auxiliary chamber;
an annular member disposed about the periphery of said elastomeric member and arranged to juxtapose the inner periphery of said outer tubular member;
first, second and third discrete channels, said first, second and third channels being formed in the external periphery of said annular member, said first and second channels having first and second lengths which are essentially equal and said third channel having a third length which is longer said first and second lengths, said first, second and third channels being enclosed by said outer tubular member in a manner to define first, second and third orifice passages, said first, second and third channels communicating with said main working chamber at their respective first ends and with said auxiliary chamber at their respective second ends; and
first, second and third electrodes disposed in said first second and third channels, respectively.

2. A mounting device comprising:
first and second rigid structural members, said second member being hollow, arranged about said first member and electrically grounded;
an elastomeric body, said elastomeric body being interposed between said first and second members;
an annular member disposed about the periphery of said elastomeric member and arranged to juxtapose the inner periphery of said second structural member, said annular member being formed with first, second and third discrete channels in the external periphery thereof, said first and second channels having first and second lengths and said third channel having a third length which is twice as long said first length, said first, second and third channels being enclosed by said second structural member in a manner to define first, second and third orifice passages;
first second and third electrically conductive electrode members respectively disposed in said first second and third channels;
means defining a first recess in said elastomeric body, said first recess being arranged to cooperate with the inner periphery of said annular member in a manner to define a first chamber, said first channel being arranged to open into said first chamber;
means defining a second recess in said elastomeric body, said second recess being arranged to cooperate with the inner periphery of said annular member in a manner to define a second chamber, said second and third channels being arranged to open into said second chamber, said elastomeric body being further formed with a diaphragm which is exposed to said second chamber, said first and second chambers and said first, second and third orifice passages being filled with an electrorheological fluid; and
connection means which provides an electrical connection between said first and second electrode members and a separate electrical connection with said third electrode member.

3. A mounting device as claimed in claim 2, wherein said first and second electrode members comprise first, second and third elongate thin electrically conductive strips which are set in the bottoms of said first second and third channels, said first second and third strips being arranged so that they are mutually distal from one another.

4. A mounting device as claimed in claim 2, wherein:
said first chamber is located between a first side of said first structural member and said second structural member; and
said second chamber is located between a second side of said first structural member and said second structural member.

5. A mounting device as claimed in claim 2, wherein said diaphragm is defined in said elastomeric body by a cavity which is located between first structural member and said second chamber.

6. A mounting device as claimed in claim 2, wherein said first and second structural members have cylindrical configurations.

7. A mounting device as claimed in claim 2, further comprising: a thin elastomeric layer disposed between said annular member and the inner periphery of said second structural member, said layer hermetically sealing said first, second and third channels.

8. A mounting device as claimed in claim 2, wherein said first and second lengths are approximately equal to ¼ of the outer perimeter of the annular member and said third length is equal to approximately ¾ the outer perimeter of said annular member.

* * * * *